United States Patent
Gaffney

(12) 
(10) Patent No.: US 6,677,270 B2
(45) Date of Patent: *Jan. 13, 2004

(54) METAL CARBIDE CATALYSTS AND PROCESS FOR PRODUCING SYNTHESIS GAS

(75) Inventor: Anne M. Gaffney, West Chester, PA (US)

(73) Assignee: ConocoPhillips Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/212,530

(22) Filed: Aug. 5, 2002

(65) Prior Publication Data

US 2002/0198101 A1 Dec. 26, 2002

Related U.S. Application Data

(62) Division of application No. 09/688,571, filed on Oct. 16, 2000, now Pat. No. 6,461,539.
(60) Provisional application No. 60/160,139, filed on Oct. 18, 1999.

(51) Int. Cl.[7] ............................................. B01J 27/22
(52) U.S. Cl. ...................................................... 502/177
(58) Field of Search ......................................... 502/177

(56) References Cited

U.S. PATENT DOCUMENTS

| | | | |
|---|---|---|---|
| 1,930,716 A | 10/1933 | Jaeger | 260/57 |
| 4,008,090 A | 2/1977 | Miyake et al. | 106/43 |
| 4,219,445 A | 8/1980 | Finch | 252/443 |
| 4,271,041 A | 6/1981 | Boudart et al. | 252/438 |
| 4,325,843 A | 4/1982 | Slaugh et al. | 252/443 |
| 4,326,992 A | 4/1982 | Slaugh et al. | 252/443 |
| 4,331,544 A | 5/1982 | Takaya et al. | 252/443 |
| 4,522,708 A * | 6/1985 | Leclercq et al. | 208/136 |
| 5,256,829 A | 10/1993 | Jacquot | 568/737 |
| 5,308,597 A * | 5/1994 | Ledoux et al. | 423/440 |
| 5,338,716 A | 8/1994 | Triplett et al. | 502/64 |
| 5,451,557 A | 9/1995 | Sherif | 502/177 |
| 5,573,991 A | 11/1996 | Sherif et al. | 502/177 |
| 6,090,992 A * | 7/2000 | Wu et al. | 502/177 |
| 6,207,609 B1 * | 3/2001 | Gao et al. | 502/177 |
| 6,211,113 B1 * | 4/2001 | Harth et al. | 502/200 |
| 6,461,539 B1 * | 10/2002 | Gaffney | 502/177 |

FOREIGN PATENT DOCUMENTS

| | | | |
|---|---|---|---|
| JP | 54089989 | 7/1979 | B01J/27/22 |
| JP | 59165374 | 9/1984 | H01M/4/90 |
| JP | 6277515 | 10/1994 | B01J/27/22 |

OTHER PUBLICATIONS

Xu, Xiaoding, and Jacob A. Moulijn (Chapter 21) "Transformation of a Structural Carrier into a Structured Catalyst" in Structured Catalysts and Reactors, (Andrzej Cybulski and Jacob A. Moulijn, eds.), Marcel Dekker, Inc. 599–615 (1998), (no month).

Claridge, John B., York, Andrew P.E., Brungs, Attila J., Alvarez, Carlos Marquez–, Sloan, Jeremy, Tsang, Shik Chi, and Malcolm Green, L.H., *New Catalysts for the Conversion of Methane to Synthesis Gas: Molybdenum and Tungsten Carbide:*, Journal of Catalysis 180, 85–100 (1998), (no month).

York, A.P.E. et al. *Stud. Surf. Sci. Catal.* (3rd World Congress on Oxidation Catalysis) 110: 711–720 (1997), (no month).

PCT Search Report for PCT/US00/2877, (no month).

* cited by examiner

*Primary Examiner*—Wayne A. Langel
(74) *Attorney, Agent, or Firm*—Conley Rose, P.C.

(57) ABSTRACT

Mixed metal carbide catalysts that are active for catalyzing the net partial oxidation of methane to CO and $H_2$ are disclosed, along with their method of making. The preferred catalysts of the invention comprise a mixture of at least two carbided metals that are prepared by the reaction of the metal oxides, alkoxides or nitrates with a hydrocarbon of the formula $C_nH_{2n+2}$ wherein n is an integer from 1 to 4. Optionally, the catalysts include an additional promoter and/or a catalyst support. Preferred catalysts are at least 50 wt % molybdenum, tungsten or chromium, and also contain a second metal selected from the group consisting of molybdenum, tungsten, vanadium, chromium, iron, niobium, tantalum, rhenium, cobalt, copper, tin and bismuth.

17 Claims, No Drawings

METAL CARBIDE CATALYSTS AND PROCESS FOR PRODUCING SYNTHESIS GAS

CROSS-REFERENCE TO RELATED APPLICATIONS

This application is a divisional of U.S. patent application Ser. No. 09/688,571 filed Oct. 16, 2000, now U.S. Pat. No. 6,461,539, which claims the benefit of U.S. Provisional Patent Application No. 60/160,139 filed Oct. 18, 1999, the disclosures of which are incorporated herein by reference.

BACKGROUND OF THE INVENTION

1. Field of the Invention

The present invention relates to catalysts and processes for producing synthesis gas (i.e., a gas mixture containing CO and $H_2$). More particularly, the invention relates to mixed and/or promoted metal carbide catalysts and their manner of making, and to processes employing such catalysts for the production of synthesis gas.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or "syngas"). In a second step, the syngas is converted to hydrocarbons, for example, using the Fischer-Tropsch process to provide fuels that boil in the middle distillate range, such as kerosene and diesel fuel, and hydrocarbon waxes.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \rightarrow CO + 3H_2 \quad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + \tfrac{1}{2}O_2 \rightarrow CO + 2H_2 \quad (2)$$

This ratio is more useful than the $H_2$:CO ratio from steam reforming for the downstream conversion of the syngas to chemicals such as methanol and to fuels. The partial oxidation is also exothermic, while the steam reforming reaction is strongly endothermic. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch Synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by prior art catalytic partial oxidation processes have placed these processes generally outside the limits of economic justification.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in the art to the development of catalysts allowing commercial performance without coke formation.

A number of process regimes have been described in the art for the production of syngas via catalyzed partial oxidation reactions. The noble metals, which typically serve as the best catalysts for the partial oxidation of methane, are scarce and expensive. The widely used, less expensive, nickel-based catalysts have the disadvantage of promoting coke formation on the catalyst during the reaction, which results in loss of catalytic activity. Over the past two decades the transition metal carbides and nitrides have been shown to exhibit catalytic properties similar to the precious metals. A. P. E. York et al., (Stud. Surf. Sci. Catal. (1997), 110 (3rd World Congress on Oxidation Catalysis, 1997), 711–720.) disclose the use of molybdenum and tungsten carbides as catalysts for the partial oxidation of methane to syngas. The reaction was done at temperatures of 1073° K and 1173° K and pressures of 4.0 bar (400 kPa) and 8.7 bar (870 kPa) using air at a GHSV of $5.2 \times 10^3$ h$^{-1}$. When the reaction was carried out at atmospheric pressure, catalyst deactivation occurred. Binary and ternary metal carbides of Mo or W and Group V metals are also disclosed.

Claridge et al. (J. Catalysis 180:85–100 (1998)) have described high-surface-area molybdenum carbide catalysts and tungsten carbide catalysts for conversion of methane to synthesis gas via steam reforming, dry reforming or partial oxidation processes. Maintaining elevated pressure during the conversion process stabilized the carbide and deterred catalyst deactivation.

U.S. Pat. No. 4,325,843 (Slaugh et al.) describes a process for making a supported tungsten carbide composition for use as a catalyst. The process includes impregnating an oxidic support material with a solution of a tungsten salt, converting the tungsten to a nitride and treating the supported tungsten nitride with a carbiding gas mixture.

U.S. Pat. No. 4,325,842 (Slaugh et al.) describes a process for preparing a supported molybdenum carbide catalyst by impregnating a porous support with a solution of hexamolybdenum dodecachloride, drying, and heating in a carbiding atmosphere. U.S. Pat. No. 4,326,992 (Slaugh et al.) describes another process for preparing a supported molybdenum carbide catalyst. In this process an ammonium hydroxide solution of molybdic acid is applied to a porous support, dried and heated in a carbiding atmosphere. U.S. Pat. No. 5,338,716 (Triplett et al.) discloses a supported non-oxide metal carbide-containing catalyst that includes an oxide support, a passivating layer, and a non-oxide metal ceramic catalytic component such as tungsten carbide or molybdenum carbide, or another Group VI metal carbide or nitride.

U.S. Pat. Nos. 5,451,557 and 5,573,991 (Sherif) disclose other processes for forming a metal carbide catalyst such as tungsten carbide or another Group VIB transition metal carbide. U.S. Pat. No. 4,331,544 (Takaya et al.) describes a catalyst for catalyzing the synthesis of methane from CO and $H_2$. This catalyst comprises a nickel-molybdenum alloy and a molybdenum carbide supported on a porous carrier. Other metal carbide catalysts are disclosed in U.S. Pat. No. 4,219,445 (Finch), U.S. Pat. No. 1,930,716 (Jaeger), and U.S. Pat. No. 4,271,041 (Boudart et al.).

There is a continuing need for better catalysts for catalyzing the partial oxidation of methane, which are capable of high conversion of reactant gas and high selectivity of CO and $H_2$ reaction products.

BRIEF SUMMARY OF THE INVENTION

The present invention provides mixed and/or promoted metal carbide catalysts which overcome many of the shortcomings of previous catalysts used to catalyze the partial oxidation of light hydrocarbons, such as methane. Also provided are processes for making the new catalysts and processes for producing synthesis gas using these catalysts. Excellent levels of conversion of methane and oxygen reactants and selectivities for CO and $H_2$ products by a predominantly, or net partial oxidation reaction are achievable by the new catalysts and process. The term "net partial oxidation" means that the partial oxidation reaction of Equation 2 predominates over reforming reactions, and the ratio of the $H_2$:CO products is preferably about 2:1. Although not wishing to be bound by a particular theory, the inventors believe that the primary reaction catalyzed by the preferred catalysts described herein is the partial oxidation reaction of Equation 2. Other chemical reactions may also occur, but to a lesser extent, catalyzed by the same catalyst composition, to yield an overall or net partial oxidation reaction. For example, in the course of syngas generation, intermediates such as $CO_2+H_2O$ may occur as a result of the oxidation of methane, followed by a reforming step to produce CO and $H_2$. Also, particularly in the presence of carbon dioxide-containing feedstock or $CO_2$ intermediate, the reaction shown in equation 3

$$CH_4+CO_2 \rightarrow 2CO+2H_2 \qquad (3)$$

may also occur to some extent during the production of syngas, in which case the molar ratio of the $H_2$ and CO products is somewhat less than the preferred Fischer-Tropsch stoichiometric ratio of 2:1 $H_2$:CO.

One advantage of the catalysts and syngas production processes of the invention is that no appreciable coking occurs with use of the new mixed metal carbide catalysts, and eventual catalyst deactivation is delayed or avoided.

Another advantage of the new catalysts and processes is that they are more economically feasible for use in commercial-scale conditions than conventional catalysts used for producing syngas.

In accordance with certain embodiments of the present invention a process for preparing a carbided metal catalyst for catalyzing the net partial oxidation of a $C_1$–$C_5$ hydrocarbon to form a product gas mixture comprising CO and $H_2$ is provided. The process comprises combining a first metal compound that is an oxide, alkoxide or nitrate of Mo, W and Cr, the metal component of which comprises at least 50 wt % of the metal content of the carbided metal catalyst, together with at least one second metal compound (not the same as the first metal compound) that is an oxide, alkoxide or nitrate of Mo, W, V, Cr, Fe, Nb, Ta, Re, Co, Cu, Sn or Bi. The metal component of the at least one second metal compound comprises about 0.1–10 wt % of the metal content of the carbided metal catalyst. The process also includes reacting or activating this combination, or intermediate composition, with a hydrocarbon of the formula $C_nH_{2n+2}$ wherein n is an integer from 1 to 4 under relatively low pressure conditions (e.g., up to about 500 sccm). The hydrocarbon may be methane, ethane, propane, butane or isobutane, for example.

In some embodiments of the above-described process, the mixed metal intermediate composition is applied to a porous or gas permeable support. The catalyst and/or the support may be in the structural form of a gauze, monolith or foam, for example. The support may contain a material such as MgO, $Al_2O_3$, $SiO_2$, $TiO_2$, titanosilicate, activated carbon, carbon molecular sieves, crystalline and non-crystalline molecular sieves, $ZrO_2$, mullite, cordierite, ceramics and mixtures thereof. The metal carbides may be mixed with, deposited on impregnated into such materials.

In some embodiments of the process for making a carbided metal catalyst, a promoter is also included in the composition. The promoter may be a metal or metal oxide of the rare earths, alkali, or alkaline earths, or a combination thereof.

Certain preferred embodiments of the process for making a carbided metal catalyst also include flushing the catalyst intermediate composition with a continuous stream of $N_2$ at a pressure of about 300 sccm and flow rate of about $5.0 \times 10^{-6}$ m$^3$/s. While continuing to flush the intermediate composition, heat is applied to the composition at a rate of 2° C./min to a temperature of about 600° C., and then the composition is held at about 600° C. for about 10 hours, after which it is cooled to room temperature. The process may include replacing the stream of $N_2$ with a stream of 10% ethane in $H_2$ at a pressure of about 500 sccm and flow rate of about $8.3 \times 10^{-6}$ m$^3$/s and then applying heat to the composition at a rate of 1° C./min to a temperature of about 700° C. The composition is held at 700° C. for about 24 hours, and subsequently cooled again to room temperature. The composition is passivated with a continuous stream of 1% $O_2$ in $N_2$ at room temperature and at a pressure of about 500 sccm and flow rate of about $8.3 \times 10^{-6}$ m$^3$/s.

The preferred processes for making the new carbided metal catalysts employ molybdenum as the first metal compound and the second metal compound is a tungsten compound. In some embodiments the molybdenum in the molybdenum compound comprises about 90–99.9 wt % of the metal content of the carbided metal catalyst, while the tungsten in the tungsten compound comprises about 90–99.9 wt %. In some other embodiments of the process the first metal compound is a molybdenum oxide, alkoxide or nitrate wherein said molybdenum comprises about 90–99.9 wt % of the metal content of said carbided metal catalyst, and each said at least one second metal compound contains a different metal chosen from the group consisting of W, Cr, Sn, V, Re, Nb and Ta.

Also in accordance with the present invention are provided carbided metal catalysts for catalyzing the net partial oxidation of a $C_1$–$C_5$ hydrocarbon to form a product gas mixture comprising CO and $H_2$. Certain preferred embodiments of the catalysts are prepared as described above.

Certain catalysts of the invention also include a porous support such as MgO, $Al_2O_3$, $SiO_2$, $TiO_2$, titanosilicate, activated carbon, carbon molecular sieves, crystalline and non-crystalline molecular sieves, $ZrO_2$, mullite, cordierite, ceramics or a mixture of these materials, which may hold the active catalyst material. Some catalysts of the invention also include a promoter such as a metal or metal oxide of the rare earth, alkali, or alkaline earth elements, or combinations thereof.

In some embodiments of the catalysts, the catalysts comprise a carbided metal composition containing a first metal chosen which is W, Mo or Cr and comprises at least 50 wt % of the metal content of the carbided metal catalyst. The catalyst also contains at least one second metal compound different than the first metal, and which is Mo, W, V, Cr, Fe, Nb, Ta, Re, Co, Cu, Sn or Bi. The second metal comprises about 0.1–10 wt % of the metal content of the active components of the carbided metal catalyst.

In certain embodiments, the first metal is molybdenum and the second metal is tungsten. In some of these embodiments, molybdenum comprises about 90–99.9 wt % of the metal content of the carbided metal catalyst, and tungsten comprises about 0.01–10 wt % of the metal content. In other embodiments, the first metal is molybdenum comprising about 90–99.9 wt % of the metal content of the carbided metal catalyst, and each of the second metal(s) is W, Cr, Sn, V, Re, Nb or Ta.

Another aspect of the present invention is a process for forming a product gas mixture comprising CO and $H_2$ from a $C_1$–$C_5$ hydrocarbon by a net partial oxidation reaction. In some embodiments the process comprises contacting a reactant gas mixture comprising the hydrocarbon and a source of oxygen with a catalytically effective amount of a carbided metal catalyst, as described above. The process includes maintaining the catalyst and the reactant gas mixture at conversion-promoting conditions of temperature, reactant gas composition and flow rate during this contacting. In some embodiments the carbided metal catalyst employed in the process is a supported catalyst. In some embodiments, the carbided metal catalyst used in the process includes a promoter.

In some embodiments of the processes of the invention, the step of maintaining the catalyst and the reactant gas mixture at conversion promoting conditions of temperature and pressure during contacting includes maintaining a temperature of about 600–1100° C. In certain preferred embodiments, the temperature is maintained at about 800–1000° C.

In some embodiments of the hydrocarbon conversion processes, the step of maintaining the catalyst and the reactant gas mixture at conversion promoting conditions of temperature and pressure during contacting includes maintaining a pressure of about 100–12,500 kPa. In certain preferred embodiments, the pressure is maintained at about 130–10,000 kPa.

Some embodiments of the processes for converting hydrocarbons to syngas comprise mixing a light hydrocarbon-containing gas feedstock and an oxygen-containing gas feedstock to provide a reactant gas mixture feedstock having a carbon:oxygen ratio of about 1.25:1 to about 3.3:1. Certain of these embodiments provide for a reactant gas mixture feed having a carbon:oxygen ratio of about 1.3:1 to about 2.2:1; and some of the more preferred of these embodiments provide a reactant gas mixture feed having a carbon:oxygen ratio of about 1.5:1 to about 2.2:1. Some embodiments employ a reactant gas mixture feed having a carbon:oxygen ratio of about 2:1.

In some embodiments of the hydrocarbon conversion processes the oxygen-containing gas further comprises steam, $CO_2$, or a combination thereof, and the process includes mixing a hydrocarbon feedstock and a gas comprising steam and/or $CO_2$ to provide the reactant gas mixture.

The $C_1$–$C_5$ hydrocarbon comprises at least about 50% methane by volume in some embodiments of the processes of the invention, and in some embodiments the hydrocarbon contains at least about 80% methane. In certain embodiments the hydrocarbon feedstock and the oxygen-containing feedstock are both pre-heated before contacting the catalyst. In certain embodiments the reactant gas mixture is passed over the catalyst at a space velocity of about 100 to about 100,000 normal liters of gas per kilogram of catalyst per hour (NL/kg/h), and in some of these embodiments the space velocity is about 500–10,000 NL/kg/h. Some embodiments of the hydrocarbon conversion processes provide for retaining the catalyst in a fixed bed reaction zone. These and other embodiments, features and advantages of the present invention will become apparent with reference to the following description.

DETAILED DESCRIPTION OF PREFERRED EMBODIMENTS

Catalyst Preparation

Carbided metal catalysts useful for the catalytic net partial oxidation of methane are prepared by first combining compounds of at least two metals selected from the group consisting of Mo, W, V, Cr, Fe, Nb, Ta, Re, Co, Cu, Sn and Bi. At least 50 weight percent of the metal component of the carbided metal catalysts comprises Mo, W or Cr. The different second metal component can vary from 0.1 to 50 weight percent and is selected from the group consisting of Mo, W, V, Cr, Fe, Nb, Ta, Re, Co, Cu, Sn and Bi. Carbides wherein the metal components contain from about 0.1 to 10 weight percent of a metal selected from the group consisting of W, Cr, Sn, V, Re, Nb and Ta and from about 90 to 99.9 weight percent Mo are preferred. It is more preferred that the carbided metal catalysts have metal components comprising from about 0.1 to about 10 weight percent W and from about 90 to 99.9 weight percent Mo.

Preferably, the metal compounds are oxides, although other compounds such as alkoxides and nitrates may be used. The at least two metal compounds are then carbided by treating with a hydrocarbon, such as methane, ethane, propane, butane and isobutane, as described in the following examples. Carbided catalysts containing tungsten and molybdenum, together, are especially preferred for obtaining a high conversion of methane and high selectivity for CO and $H_2$ products. The inventor has discovered that this mixed and/or promoted metal carbide catalyst, provides an unexpected, synergistic effect when employed as a syngas catalyst in a short contact time reactor.

EXAMPLES

Comparative Example A $MoC_2$

In a vertical quartz reactor tube equipped with a fritted glass bottom, $MoO_3$ (5.00 g) was semi-fluidized in 300 sccm ($5.0 \times 10^{-6}$ m$^3$/s) of $N_2$. The sample was heated at 2° C./minute to 600° C. and held at 600° C. for 10 hours. After cooling to room temperature, the $N_2$ was replaced with 10% ethane in $H_2$ at 400 sccm ($6.7 \times 10^{-6}$ m$^3$/s). The sample was heated at 1° C./minute to 700° C. and reduced at 700° C. for 24 hours. After cooling, it was passivated in 1% $O_2$ in $N_2$ at 500 sccm ($8.3 \times 10^{-6}$ m$^3$/s) at room temperature overnight. X-ray diffraction analysis showed the presence of $MoC_2$.

Comparative Example B

WC

The procedure was identical to that of Ex. A above except that $WO_3$ (5.00 g) was used. X-ray diffraction analysis showed the presence of WC.

Comparative Example C $Cr_3C_2$

The procedure was identical to that of Ex. A above except that $Cr_2O_3$ (5.00 g) was used. X-ray diffraction analysis showed the presence of.$Cr_3C_2$.

Example 1

10% W/Mo$_2$C

In a ceramic jar MoO$_3$ (50.0070 g) and WO$_3$ (4.9604 g) were added to 80 alumina beads and enough distilled water was added to just cover the top of the solids. The jar was ball milled at 75 rpm overnight. The resulting paste was dried at 110° C. At this point, a sample of the dried material (5.00 g) was placed in a vertical quartz reactor tube equipped with a fritted glass bottom and the treatment procedure of Ex. A was followed. A carbided catalyst in which the weight ratio of W:Mo was 1:9 was obtained.

Example 2

5% Cr/Mo$_2$C

An aqueous solution of Cr(NO$_3$)$_3$·9H$_2$O (5.0016 g) was added to MoO$_3$ (20.1211 g) to achieve wet impregnation. The resulting paste was mixed well with a spatula and dried at 110° C. At this point, a sample of the dried material (5.00 g) was placed in a vertical quartz reactor tube equipped with a fritted glass bottom and the treatment procedure of Ex. A was followed. A carbided catalyst in which the weight ratio of Cr:Mo was 1:19 was obtained.

Example 3

1% Sn/Mo$_2$C

A 15 wt. % aqueous, colloidal dispersion of SnO$_2$ (3 g.) was diluted with distilled water and added to MoO$_3$ (50.01 g) to achieve wet impregnation. The resulting paste was mixed well with a spatula and dried at 110° C. At this point, a sample of the dried material (5.00 g) was placed in a vertical quartz reactor tube equipped with a fritted glass bottom and the treatment procedure of Ex. A was followed. A carbided catalyst in which the weight ratio of Sn:Mo was 1:99 was obtained.

Example 4

10% V/Mo$_2$C

In a ceramic jar MoO$_3$ (50.0001 g) and V$_2$O$_5$ (14.4204 g) were added to 110 alumina beads and enough distilled water was added to just cover the top of the solids. The jar was ball milled at 75 rpm overnight. The resulting paste was dried at 110° C. At this point, a sample of the dried material (5.00 g) was placed in a vertical quartz reactor tube equipped with a fritted glass bottom and the treatment procedure of Ex. A was followed. A carbided catalyst in which the weight ratio of V:Mo was 1:9 was obtained.

Example 5

1% Re/Mo$_2$C

A 7.6 wt. % aqueous solution of Re$_2$O$_7$ (6.0526 g.) was diluted with distilled water and added to MoO$_3$ (50.00 g) to achieve wet impregnation. The resulting paste was mixed well with a spatula and dried at 110° C. At this point, a sample of the dried material (5.00 g) was placed in a vertical quartz reactor tube equipped with a fritted glass bottom and the treatment procedure of Ex. A was followed. A carbided catalyst in which the weight ratio of Re:Mo was 1:99 was obtained.

Example 6

1% Nb/Mo$_2$C

A 10 wt. %/volume solution of Nb(OC$_3$H$_7$)3 in isopropanol/hexane (14.823 g) was diluted with additional isopropanol and added to MoO$_3$ (50.0004 g) to achieve wet impregnation. The resulting paste was mixed well with a spatula and dried at 110° C. in a vacuum oven. At this point, a sample of the dried material (5.00 g) was placed in a vertical quartz reactor tube equipped with a fritted glass bottom and the treatment procedure of Ex. A was followed. A carbided catalyst in which the weight ratio of Nb:Mo was 1:99 was obtained.

Example 7

1% Ta/Mo$_2$C

A 10 wt. %/volume solution of Ta(OC$_3$H$_7$)$_5$ in isopropanol/hexane (9.32 g.) was diluted with additional isopropanol and added to MoO$_3$ (50.00 g) to achieve wet impregnation. The resulting paste was mixed well with a spatula and dried at 110° C. in a vacuum oven. At this point, a sample of the dried material (5.00 g) was placed in a vertical quartz reactor tube equipped with a fritted glass bottom and the treatment procedure of Ex. A was followed. A carbided catalyst in which the weight ratio of Ta:Mo was 1:99 was obtained.

Catalyst supports may also be employed in preparing any of the above-described catalysts using techniques well known in the art for forming or applying the active catalyst components, such as impregnation, xerogel or aerogel formation, freeze-drying, spray drying, and spray roasting. In addition to catalyst powders, extrudates and pellets, monoliths can be used as supports provided that they have sufficient porosity for reactor use. The supports used with some of the catalyst compositions may be in the form of monolithic supports, or configurations having longitudinal channels or passageways permitting high space velocities with a minimal pressure drop. Such configurations are known in the art and described in the literature, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst"). Some suitable support materials include MgO, Al$_2$O$_3$, SiO$_2$, TiO$_2$, titanosilicate, activated carbon, carbon molecular sieves, crystalline and non-crystalline molecular sieves (e.g., zeolites and MCM-41, respectively), $ZrO_2$, mullite, cordierite, ceramics (e.g., LAS, OBSiC, ZTA, PSZ(Mg) and FSZ(Ca) which are commercially available from Vesuvius Hi-Tech Ceramics Inc., Alfred Station, New York), or a mixture of any of these materials. Preferably the catalysts are configured as a gauze, monolith, foam or the like, to facilitate high space velocities and high syngas productivities.

An additional promoter that is a metal or metal oxide of the rare earth, alkali, or alkaline earth elements (i.e., Groups IA and IIA), or a combination of any of these, may also be included in preparing any of the above-described compositions, to provide an active syngas catalyst.

Test Procedure

The exemplary catalysts described above were evaluated in a 25 cm long×4 mm i.d. quartz tube reactor equipped with a co-axial quartz thermocouple well, similar to the laboratory scale millisecond contact time reactor described in the literature by Green et al. (U.S. Pat. No. 5,431,855), for example. The void space within the reactor was packed with quartz chips. The catalyst bed (2 mL charge) was positioned with quartz wool at about the mid-length of the reactor. The catalyst bed was heated with a 4 inch (10.2 cm) 600 watt band furnace at 90% electrical output. All runs were done at a $CH_4:O_2$ molar ratio of 2:1, a GHSV of 3000,with a feed composition of 15% $O_2$, 30% $CH_4$ and 55% $N_2$, at 900° C. and at a pressure of 5 psig (136 kPa). The reactor effluent was analyzed using a gas chromatograph equipped with a thermal conductivity detector. The C, H and O mass balances were all between 98% and 102%. The runs were conducted over two operating days with 6 hours of run time each day. The results are shown in Table 1.

TABLE 1

| Ex. | Catalyst | % $CH_4/O_2$ Conv. | % $CO/H_2$ Sel. |
|---|---|---|---|
| A | $Mo_2C$ | 38/100 | 68/26 |
| B | WC | 39/100 | 76/50 |
| C | $Cr_3C_2$ | 23/100 | 83/65 |
| 1 | 10% W/$Mo_2C$ | 89/100 | 87/89 |
| 2 | 5% Cr/$Mo_2C$ | 59/100 | 76/85 |
| 3 | 1% Sn/$Mo_2C$ | 50/100 | 69/52 |
| 4 | 10% V/$Mo_2C$ | 58/100 | 76/69 |
| 5 | 1% Re/$Mo_2C$ | 47/100 | 66/74 |
| 6 | 1% Nb/$Mo_2C$ | 20/100 | 54/36 |
| 7 | 1% Ta/$Mo_2C$ | 55/100 | 83/88 |

It can be seen in Table 1 that the tungsten/molybdenum carbide catalyst provided conversions and syngas selectivities that are significantly higher than those of each of the carbides alone. Interestingly, this observation differs from that of the literature, which suggests no synergistic effects with mixed metal carbides and reports generally higher conversion and selectivity values for various single metal carbide compositions. (See A. P. E. York et al., (Stud. Surf. Sci. Catal. (1997), 110 (3rd World Congress on Oxidation Catalysis, 1997), 711–720, for example.) While not wishing to be bound by a particular theory, the inventor suggests that the lower pressure activation process described herein may provide a catalytic material that differs from other methods employing high pressure activation processes to produce metal carbide catalysts. In the present studies, the observed stoichiometry of reactants and products suggests that the catalytic partial oxidation of methane is the predominant oxidation reaction taking place, and is consistent with a net partial oxidation reaction.

Process of Producing Syngas

The above-described mixed metal carbide catalysts are placed in a commercial scale short contact time reactor, also called a millisecond contact time reactor for synthesis gas production. This economical reactor design reduces capital investment and operating costs. The catalyst is preferably configured as a highly gas permeable or porous gauze, monolith, foam, or the like, to achieve high space velocities and high syngas productivities. A feed stream comprising a hydrocarbon feedstock and an oxygen-containing gas is contacted with one of the above-described mixed and/or promoted metal carbide catalysts in a reaction zone maintained at partial oxidation-promoting conditions effective to produce an effluent stream comprising carbon monoxide and hydrogen. The hydrocarbon feedstock may be any gaseous hydrocarbon having a low boiling point, such as methane, natural gas, associated gas, or other sources of light hydrocarbons having from 1 to 5 carbon atoms. The hydrocarbon feedstock may be a gas arising from naturally occurring reserves of methane which contain carbon dioxide. Preferably, the feed comprises at least 50% by volume methane, more preferably at least 75% by volume, and most preferably at least 80% by volume methane.

The hydrocarbon feedstock is in the gaseous phase when contacting the catalyst. The hydrocarbon feedstock is contacted with the catalyst as a mixture with an oxygen-containing gas, preferably pure oxygen. The oxygen-containing gas may also comprise steam and/or $CO_2$ in addition to oxygen. Alternatively, the hydrocarbon feedstock is contacted with the catalyst as a mixture with a gas comprising steam and/or $CO_2$. Preferably, the methane-containing feed and the oxygen-containing gas are mixed in such amounts to give a carbon (i.e., carbon in methane) to oxygen (i.e., oxygen) ratio from about 1.25:1 to about 3.3:1, more preferably, from about 1.3:1 to about 2.2:1, and most preferably from about 1.5:1 to about 2.2:1, especially the stoichiometric ratio of 2:1. The catalyst is initially heated, and after ignition an autothermal net partial oxidation reaction ensues, and the reaction conditions are maintained to promote continuation of the autothermal process. For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about a 1.5:1 to about 2.3:1 ratio of carbon:oxygen. The hydrocarbon:oxygen ratio is the most important variable for maintaining the autothermal reaction and the desired product selectivities. Residence time, amount of feed preheat and amount of nitrogen dilution, if used, also affect the reaction products. Preferably a catalyst residence time of no more than about 10 milliseconds for the reactant gas mixture is maintained.

The process is operated at atmospheric or superatmospheric pressures, the latter being preferred. The pressures may be from about 100 kPa to about 12,500 kpa, preferably from about 130 kPa to about 10,000 kPa. The process is preferably operated at temperatures of from about 600° C. to about 1100° C., preferably from about 800° C. to about 1000° C. The hydrocarbon feedstock and the oxygen-containing gas are preferably pre-heated before contact with the catalyst.

The hydrocarbon feedstock and the oxygen-containing gas are passed over the catalyst at any of a variety of space velocities. Space velocities for the process, stated as normal liters of gas per kilogram of catalyst per hour, are from about 100 to about 100,000 NL/kg/h, preferably from about 500 to about 10,000 NL/kg/h. The effluent stream of product gases, including CO and $H_2$, emerges from the reactor.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents and publications cited herein are incorporated by reference in their entirety.

What is claimed is:

1. A process of making a carbided metal catalyst for catalyzing the partial oxidation of a $C_1$–$C_5$ hydrocarbon to form a product gas mixture comprising CO and $H_2$, the process comprising:

combining
      a first metal compound comprising an oxide, alkoxide or nitrate of a first metal chosen from the group consisting of Mo, W and Cr, said first metal comprising at least about 50 wt % of the metal content of said carbided metal catalyst, and
      at least one second metal compound, containing a different metal than said first metal, chosen from the group consisting of metal compounds comprising oxides, ailcoxides and nitrates of Mo, W, V, Cr, Fe, Nb, Ta, Re, Co, Cu, Sn and Bi, the metal component of said at least one second metal compound comprising about 0.1–10 wt % of the metal content of said carbided metal catalyst, to provide a catalyst intermediate composition;

optionally, loading a porous support with said intermediate composition;

combining a promoter chosen from the group consisting of metals and metal oxides of rare earth, alkali and alkaline earth elements of the periodic table of the elements, and combinations thereof, with said first and second metal compounds, and reacting said intermediate composition with a gaseous hydrocarbon of the formula $C_nH_{2n+2}$ wherein n is an integer from 1 to 4, at a gas flow rate up to about 500 sccm, to provide a catalyst consisting essentially of:
      a carbided metal composition containing Mo, W or Cr, and at least one other metal chosen from the group consisting of Mo, W, V, Cr, Fe, Nb, Ta, Re, Co, Cu, Sn and Bi,
      a promoter chosen from the group consisting of rare earth, alkali and alkaline earth elements, and
      optionally, a support.

2. The process of claim 1 wherein said reacting comprises:
   flushing said catalyst intermediate composition with a continuous stream of an inert gas;
   while continuing to flush said intermediate composition, applying heat to said composition up to a temperature of about 600° C.;
   cooling said heated composition to about room temperature;
   replacing said stream of inert gas with a stream of said hydrocarbon gas and $H_2$ at a flow rate up to about 500 sccm;
   applying heat to said composition up to a temperature of about 700° C.;
   cooling said composition; and
   passivating said composition with a continuous stream of $O_2$ and an inert gas.

3. The process of claim 2 comprising:
   flushing said catalyst intermediate composition with a continuous stream of $N_2$ at a flow raze of about 300 sccm (about $5.0\times10^{-6}$ m³/s);
   while continuing to flush said intermediate composition, applying heat to said composition at a rate of 2° C./min to a temperature of about 600° C., and then holding said composition at about 600° C. for about 10 hours;
   cooling said intermediate composition to room temperature;
   replacing said stream of $N_2$ with a stream of 10% ethane in $H_2$ at a flow rate of about 500 sccm (about $8.3\times10^{-6}$ m³/s);
   applying heat to said composition at a rate of 1° C./min to a temperature of about 700° C., and then holding said composition at 700° C. for about 24 hours, and subsequently cooling said composition to room temperature; and
   passivating said composition with a continuous stream of 1% $O_2$ in $N_2$ at room temperature and at a flow rare of about 500 sccm (about $8.3\times10^{-6}$ m³/s), to provide a composition with activity for catalyzing the partial oxidation of methane to CO and $H_2$.

4. The process of claim 1 comprising loading a porous support with said intermediate composition, said support comprising a material chosen from the group consisting of MgO, $Al_2O_3$, $SiO_2$, $TiO_2$, titanosilicate, activated carbon, carbon molecular sieves, crystalline and non-crystalline molecular sieves, $ZrO_2$, mullite, cordierite, ceramics and mixtures thereof.

5. The process of claim 1 wherein said reacting comprises treating said intermediate composition with a hydrocarbon chosen from the group consisting of methane, ethane, propane, butane and isobutane.

6. A catalyst prepared by the process of claim 1 and having activity for catalyzing the partial oxidation of methane to CO and $H_2$.

7. The catalyst of claim 6 comprising a gas permeable 3-dimensional structure chosen from the group consisting of gauzes, monoliths and foams.

8. The catalyst of claim 6 wherein said support comprises powder, extrudates or pellets.

9. The catalyst of claim 6 wherein said first metal is molybdenum and comprises about 90–99.9 wt % of the metal content of said carbided metal catalyst, and each said at least one second metal is chosen from the group consisting of W, Cr, Sn, V, Re, Nb and Ta.

10. The catalyst of claim 6 wherein said first metal is molybdenum and comprises about 90–99.9 wt % of the metal content of said carbided metal catalyst, and said second metal is tungsten and comprises about 0.01–10 wt % of the metal content of said carbided metal catalyst.

11. A catalyst having activity for catalyzing the partial oxidation of a $C_1$–$C_5$ hydrocarbon to form a product gas mixture comprising CO and $H_2$, said catalyst comprising a carbided metal composition containing a first metal chosen from the group consisting of Mo, W and Cr, comprising at least about 50 wt % of the metal content of said catalyst, and at least one second metal different than said first metal, chosen from the group consisting of Mo, W, V, Cr, Fe, Nb, Ta, Re, Co, Cu, Sn and Bi, comprising about 0.1–10 wt % of the metal content of said catalyst;

a promoter chosen from the group consisting of the metals and metal oxides of the rare earth, alkali, and alkaline earth elements, and combinations thereof, and optionally, a porous support, said catalyst prepared by a process comprising:

combining
- a first metal compound comprising an oxide, alkoxide or nitrate of a first metal chosen from the group consisting of Mo, W and Cr, and
- at least one second metal compound, containing a different metal than said first metal, chosen from the group consisting of metal compounds comprising oxides, alkoxides and nitrates of Mo, W, V, Cr, Fe, Nb, Ta, Re, Co, Cu, Sn and Bi, to provide a catalyst intermediate composition;

optionally, loading a porous support with said intermediate composition;

combining a promoter chosen from the group consisting of metals and metal oxides of rare earth, alkali and alkaline earth elements of the periodic table of the elements, and combinations thereof, with said first and second metal compounds; and reacting said intermediate composition with a gaseous hydrocarbon of the formula $C_nH_{2n+2}$ wherein n is am integer from 1 to 4, at a gas flow rate up to about 500 sccm.

12. The catalyst of claim 11 wherein said first metal is molybdenum and comprises about 90–99.9 wt % of the metal content of said carbided metal catalyst, and said second metal is tungsten and comprises about 0.01–10 wt % of the metal content of said carbided metal catalyst.

13. The catalyst of claim 12 wherein said catalyst comprises a synergistic combination of molybdenum carbide and tungsten carbide when catalyzing the partial oxidation of said $C_1$–$C_5$ hydrocarbon to form CO and $H_2$.

14. The catalyst of claim 11 wherein said process comprises, prior to said reacting, loading a porous support with said intermediate composition, said support comprising a material chosen from the group consisting of MgO, $Al_2O_3$, $SiO_2$, $TiO_2$, titanosilicate, activated carbon, carbon molecular sieves, crystalline and non-crystalline molecular sieves, $ZrO_2$, mullite, cordierite, ceramics and mixtures thereof.

15. The catalyst of claim 11 comprising a gas permeable 3-dimensional structure chosen from the group consisting of gauzes, monoliths and foams.

16. The catalyst of claim 11 wherein said support comprises powder, extrudates or pellets.

17. The catalyst of claim 11 wherein said first metal is molybdenum and comprises about 90–99.9 wt % of the metal content of said carbided metal catalyst, and each said at least one second metal is chosen from the group consisting of W, Cr, Sn, V, Re, Nb and Ta.

* * * * *

UNITED STATES PATENT AND TRADEMARK OFFICE
CERTIFICATE OF CORRECTION

PATENT NO. : 6,677,270 B2
DATED : January 13, 2004
INVENTOR(S) : Anne M. Gaffney It is certified that error appears in the above-identified patent and that said Letters Patent is hereby corrected as shown below:

Column 11,
Line 31, "ailcoxides" should be -- alkoxides --.

Column 12,
Line 25, "rare" should be -- rate --.

Signed and Sealed this

Sixth Day of April, 2004

JON W. DUDAS
*Acting Director of the United States Patent and Trademark Office*